United States Patent [19]

Winkler

[11] Patent Number: 4,705,934

[45] Date of Patent: Nov. 10, 1987

[54] ARC WELDER

[76] Inventor: Harry L. Winkler, P.O. Box 632, Pinehurst, Id. 83850

[21] Appl. No.: 713,288

[22] Filed: Mar. 18, 1985

[51] Int. Cl.$^4$ .............................................. B23K 9/10
[52] U.S. Cl. ........................... 219/137 PS; 219/69 R; 219/130.1; 219/134
[58] Field of Search .............. 219/137 PS, 130.1, 133, 219/134, 136, 69 R

[56] References Cited

U.S. PATENT DOCUMENTS 3,676,694  7/1972  Schneider et al. .............. 219/134 X
3,770,976  11/1973  Stroud et al. .................... 219/133 X

FOREIGN PATENT DOCUMENTS 2807342  8/1979  Fed. Rep. of Germany ...... 219/133
53-652    4/1979  Japan ................................. 219/130.1
155950   12/1979  Japan ................................. 219/130.1
22456     2/1980  Japan ................................. 219/130.1

Primary Examiner—E. A. Goldberg
Assistant Examiner—C. M. Sigda

[57] ABSTRACT

An arc welder designed to receive its principal source of power from a vehicle's alternator which is controlled by a special controlled battery charger. This welder has a 36 volt battery system that is used as a supplement power supply. The principal power source only can be used in welding or the supplement power supply can be used in welding or both principal power source and the supplement power supply can be combined at the work load in welding, and during the time when the arc is not generated the battery system is being re-charged. Inductors and a switching system are used to control the current flow from the battery system to the work load in welding. Also, the battery system can be used direct for heavy duty cutting and/or for extra-heavy duty welding thus giving the operator an extremely wide range of current to fit his needs.

5 Claims, 1 Drawing Figure

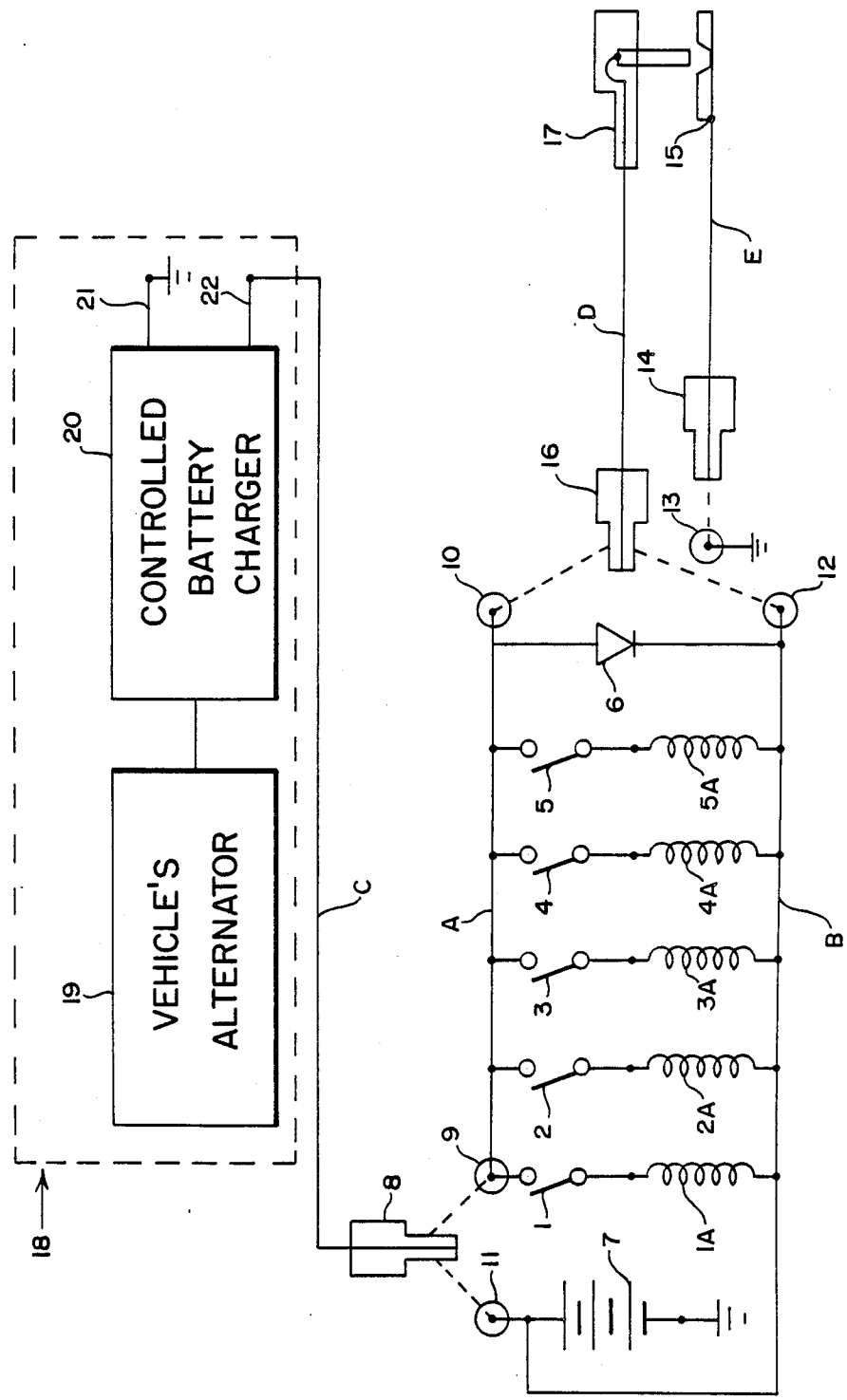

ARC WELDER

CROSS-REFERENCE TO RELATED APPLICATIONS

The invention herein is related to my Vehicular Battery Charger U.S. Pat. No. 4,449,089 filed Nov. 16, 1981, granted May 15, 1984 and to my Vehicular Arc Welder, Application Ser. No. 472,288 filed Mar. 7, 1983 now U.S. Pat. No. 4,590,357. The present invention, as well as said prior art arc welder, both receive their source of power from said battery charger, U.S. Pat. No. 4,449,089.

BACKGROUND OF THE INVENTION

1. Field of the Invention

The present invention is an apparatus for arc welding (rod type electrode) that can be used anywhere an automobile type vehicle can go.

2. Description of the Prior Art

The general public uses two types of arc welders. One type is a wire feed and the other is a rod type electrode. There is a large number of AC powered arc welders. AC powered arc welders are not useable in remote locations. One AC powered arc welder, the Japanese Pat. No. J54155950, uses a combination of both AC and battery power. Century Manufacturing Company is producing a portable MIG wire feed welder that is powered by a 24 volt battery system of which said batteries are charged in parallel at 12 volts, hence making their welding duty cycle time extra limited. Two other arc welders, U.S. Pat. Nos. 3,676,694 and 3,770,976, use a vehicle's alternator for welding. Even though they use high output alternators, their welding ability is very limited when used for cutting or for burning the weld in extra deep in heavy duty welding. To my knowledge, the most popular portable arc welders on the market at the present time have their own motor, generator, fuel tank and usually a 12 volt battery, Etc., all contained within their own framework, thus making said welder big, heavy, cumbersome and expensive, especially for a welder that can handle heavy duty welding. Said welders are either a wire feed or rod type electrode arc welder.

Since most welding is done in remote locations is repair work and at times you don't have a cutting torch or acetylene and/or oxygen to power said torch, at times like that it is necessary to use the arc welder's electrode to cut with, hence increased amperage increases the cutting ability of said electrode. Also, at times it is beneficial to burn in the first pass in welding deeply, thus requiring high amperage power. The present invention helps to solve the problems listed in prior art as can be seen in the forthcoming specifications. Going back to prior art, in my patent application, Ser. No. 472,288, for a vehicular arc welder, filed on Mar. 7, 1983, I used 12 inductors in series, 4 batteries in series (for example, 24, 30, 36, 42 volts for welding) and charged said batteries in series direct, as used. Also, I charged said batteries in series through the inductors from the work load, however this was not listed in the prior art specifications because it was not pictured in the drawing. The present invention is an improvement over my own prior art, at least for some people, as can be seen in the forthcoming specifications of the present invention.

SUMMARY OF THE INVENTION

The object of the present invention was to work for a new and/or better rod type arc welder. (Please keep in mind, what is better for some is not necessarily better for others.) From time to time it is desirable to have an arc welder that can be used anywhere, and you are not always around AC power. The present invention solves this problem by making use of the vehicle's alternator and a special controlled battery charger as a principal source of power and a 36 volt battery system as a supplement power supply. Further object of the present invention was to build this arc welder with the following desirable features:

1. To install an arc welder in an automobile type vehicle, thus making the arc welder portable.

2. Requiring a special controlled battery charger to be installed in a vehicle to control the vehicle's alternator's output power. Some of the battery charger's controls used with the arc welder are: a volt meter, an ammeter, an adjustable voltage control that regulates the alternator's output voltage, an adjustable output current limiter that regulates the alternator's output current.

3. To use the vehicle's alternator as a principal source of power for the arc welder.

4. To use a 36 volt battery system as a supplement power supply for the arc welder.

5. To use 5 inductors and a switching system as a means of controlling the current used in welding from the battery system.

6. For light duty welding, the principal source of power can be used direct at the work load in welding.

7. Also, for light duty welding, the principal power source may be connected direct to the battery system and then select the current desired by using the switching system.

8. Means of combining the two sources of power at the work load in welding. The principal source of power is used as a means of supplying the first portion of energy used in welding and the supplement power supply is used to make up the balance of energy used in welding, and during the time when the arc is not generated, the battery system is being re-charged.

9. The switching system and the inductor's system consists of 5 inductor switches and 5 inductors thus giving the ability to produce up to 25 different current levels for use in welding in 10 amp jumps, from 10 amps through 250 amps output power. When the two sources of power are combined, say for example, the principal source of power is regulated at 60 amps in welding and the supplement power is added to the 60 amps thus giving a total controlled welding power of 70 amps through 310 amps.

10. For heavy duty cutting, the battery system can be used direct.

11. For extra heavy duty welding, the battery system can be used direct.

12. The arc welder can be built-in, becoming a premanent part of a vehicle, thus permitting full use of the floor space of the vehicle.

BRIEF DESCRIPTION OF THE DRAWING

Essential for the operation of the arc welder, is a principal power source (outlined by the broken lines). However, the broken lines shown between the jack plugs #8, #14, #16 and the jacks #9, #10, #11, #12, #13 point to the different jacks that the jack plug can be plugged into to obtain different results in the operation of the arc welder. The welding cables can be reversed for straight polarity. The switches shown in the drawing are mechanical, it will be understood they could be electro-magnetic relay switches.

DESCRIPTION OF THE PREFERRED EMBODIMENT

The present invention is an apparatus for arc welding, rod type electrode. Means for the arc welder to be installed in an autombile type vehicle, thus making the arc welder usable anywhere the vehicle can go. The present invention requires the vehicle to have an alternator #19. (In the event the alternator #19 has a built-in regulator, this regulator would have to be disabled.) The vehicle is also required to be equipped with a special controlled battery charger #20 to control the alternator's #19 output power. The vehicle's alternator #19 combined with the special controlled battery charger #20 becomes the principal power source #18 for the arc welder. It will be understood that the vehicle's alternator #19 could be changed to a higher output power if desired. It is very important that the principal power source #18 has a well controlled voltage charge level for charging the arc welder's battery system #7. I feel the damage resulting from overcharging batteries, as well as running the batteries too low, needs no explanation as this is well known. Following is a short rundown on some of the battery charger's #20 U.S. Pat. No. 4,449,089 special controls: 1—ammeter, used as a guide in charging battery(s) and also shows where the output power is regulated at during welding; 2—voltmeter, shows the voltage of the battery(s); 3—the battery charger #20 utilizes the alternator #19 of the vehicle that the battery charger #20 has been installed in, thus permitting the alternator #19 to charge either the internal battery system of a vehicle, or to charge an external battery or batteries; 4—the battery charger #20 has a voltage sensor that senses the voltage of an external battery or batteries being charged. The voltage sensor is adjustable, thus providing means for a sensed, controlled, pre-set charge level for an external battery(s); 5—battery charger #20 has an overload protector, thus protecting the alternator #19 from an overload, which is an adjustable current limiter, thus permitting the alternator #19 to produce a predetermined maximum current level and then regulating the alternator's #19 output current at the predetermined level, hence providing a regulated current in welding. For example, if said current limiter is adjusted at 60 amps and run the vehicle's motor at 900 RPM low and 1500 RPM high (in tests, this varies with different alternators) and the battery system #7 is down some, the batteries will charge at about 38 amps at 42 volts, and then you start welding, the charger #20 will regulate the alternator's #19 output current at 60 amps. The reason for this is 38 amps at 42 volts is one thing, however in welding the alternator's #19 output drops to about 22 to 26 volts at the work load, thus increasing the alternator's #19 output current to 60 amps. In the event you stick the welding rod, thus causing the output voltage to drop to almost zero at the alternator's #19 output, however the battery charger's #20 current limiter is still being regulated at about 60 amps, hence making the alternator's total output in watts extremely low as well as the alternator's diodes heating effect, thus making an ideal alternator protector when used in an arc welder of this type. A short look at some of the benefits the battery charger's #20 current limiter has when charging the 36 volt battery system #7. First, it doesn't make any difference how low the batteries are, of if they have some dead cells or not since the charger's maximum output current would be 60 amps, again protecting the alternator from an overload. I will make a short statement on the battery charger's #20 switching system. I have added a circuit to the switching system to cut off the alternator's output power momentarily while switching. (I only mention the battery charger's switching system to help you understand the operation better.) When the arc welder's batteries #7 set for a period of time, the batteries will lose charge. Also when the batteries are used in welding, the batteries are not always left in a full charge state. Anytime it is desirable the batteries can be recharged while the vehicle is traveling on the road, as when you switch from internal to external the circuit will first cut off the alternator's #19 field current and then the power switch will switch to external and then the circuit will turn the alternator's field current back on. The same circuit reverses itself when going from external to internal, hence no load on the power relay points when switching from internal to external or vice/versa. As can be seen, it makes no difference the RPM of the vehicle's motor when switching the battery charger's #20 internal/external switch.

The arc welder uses a 36 volt battery system #7 consisting of three 12 volt automotive type batteries connected in series and means for the battery system #7 to receive, store and transmit energy. The battery system #7 is used as a supplement power supply for the arc welder. A charge level of 43.5 volts is used to charge the arc welder's battery system #7. I have used about 100 lbs. of welding rod using the same and they are doing excellent in all ways.

Five inductors and a switching system are used as a means of controlling the current used in welding from the battery system #7. (More on this subject four paragraphs from here.)

For light duty welding, the principal source of power #18 can be used direct at the work load up to the battery charger's #20 current limit setting.

Also, for light duty welding, the principal power source #18 may be connected direct to the battery system #7 and then select the current desired by using the switching system.

Means of combining the two sources of power at the work load in welding. The principal source of power #18 is used as a means of supplying the first portion of energy used in welding, the supplement power supply is used to make up the balance of energy used in welding and during the time when the arc is not generated the battery system #7 is being re-charged through the diode #6. The reason for this is, as soon as the voltage at the work load exceeds the battery's #7 voltage by about 0.7 volt the diode #6 will conduct thus raising the positive voltage level of the battery system #7 and when a significant voltage level is reached to reverse the battery's #7 current the battery #7 will charge. Also, the battery #7 will charge some through the inductors and the switching system. The reason for this is, when the diode #6 conducts there is at least a 0.7 volt drop across the diode #6 and this voltage will pass through whichever inductor(s) that is switched ON.

The switching system and the inductor's system consists of 5 inductor switches and 5 inductors which has the ability to produce up to 25 different current levels for use in welding in 10 amp jumps from 10 amp through 250 amps output power. When the two sources of power are combined in this instance, say the alternator's #19 output power is regulated at 60 amps in welding and the supplement power is added to the 60 amps thus giving a total controlled welding power of 70 amps through 310 amps. The reason for this is, each switch will turn ON 1 inductor and the switches can be used in any order or combination. For example, say the principal power source #18 supplies 60 amps in welding and the inductors and switches in this instance are: switch #1=10 amp, #2=20 amp, #3=40 amp, #4=80 amp and #5=100 amp. For 70 amps welding power turn ON #1 switch. For 110 amps welding power turn ON #1 switch and #3 switch. For 200 amps welding power turn ON #3 switch and #5 switch (could also be #2 switch, #3 switch and #4 switch). For 310 amps welding power turn ON all 5 switches. Please keep in mind that the inductor's value could be lower in power, for example switch #1=10 amp, #2=20 amps, #3=40 amp, #4=60 amp and #5=60 amp, thus giving 19 different power levels from 10 amp through 190 amps and to add the prinicpal power source #18 at 60 amps to the 190 amps would give a total of 250 amps welding power. Hence as can be seen, raising the alternator's #19 output power higher than 60 amps in welding would also increase the total amperage for welding as well as increasing the duty cycle in welding. Some of the advantages of combining the two power sources are: permits an alternator to be used as a source of power in welding and provides a way of boosting the welding current higher at the work load. Also provides a higher voltage at the work load for a given battery voltage thus providing a better arc in welding. The reason for this is, the alternator's output power is direct at the work load thereby supplying, say 60 amps, power in welding. Only the balance of energy used in welding goes through the inductors thus keeping the inductor's voltage higher at the work load. I believe that alternator being regulated in welding and the alternator's high frequency output power helps to aid the arc in welding thereby making the inductors more effective thus increasing the voltage at the work load. Also, the inductors operate cooler since only part of the total welding current goes through them.

For heavy duty cutting, use the battery #7 power direct at the work load and use straight polarity by connecting the welding cable #E to jack #12 and the other welding cable #D to jack #13 which is the ground. The reason straight polarity works best for cutting is well known.

For extra-heavy duty welding, the battery #7 can be used direct at the work load, as this provides maximum power for welding. Use either plurality for welding as desired.

Installation of the arc welder within an automotive type vehicle. Since there is such a wide range of different kinds, sizes and shapes of automotive type vehicles thus being impractical to describe each installation, therefor "installation means" are being claimed. Means for installation of the diode #6; means for installation of the 5 inductors; means for installation of the 5 jacks; means for installation of the three 12 volt batteries; means for installation of the 3 jack plugs; means for installation of the inductor's switching system; means for installation of the arc welder to retain full floor space of a vehicle. Means for installation of the arc welder in the event there is not ample space or is not desired to retain full floor space of a vehicle.

In the drawing, I used 5 mechanical swtiches as I thought the switching system would be easier to understand and less confusing. It will be understood that electro magnetic relay switches may be used if desired as there is no difference in the welding ability of the arc welder as long as the rating of the switches used will carry the inductor's output power in welding.

The inductor's resistance value was chosen to produce a given welding amperage at the work load while using a 36 volt battery system, also based on using a principal power source of 60 amps at the work load in welding at the same time, as in the following list:

1A coil: 1.2 ohms equals 10 amps welding power
2A coil: 0.6 ohms equals 20 amps welding power
3A coil: 0.3 ohms equals 40 amps welding power
4A coil: 0.15 ohms equals 80 amps welding power
5A coil: 0.12 ohms equal 100 amps welding power.

The welding current from the inductors is based on tests on the average welding amperage while holding a normal arc-gap in welding. It will be understood that the inductor's resistance may vary somewhat in actual production of the inductors. As can be seen, I used inductive resistance for controlling the current used in welding from the battery system. Pure resistance could be used for controlling the current in welding, however inductive resistance is preferred.

The 5 inductors and the 5 switches are connected 1 each in series between lead #A and lead #B. The switches will operate independent of each other, for example, the #1 switch will turn ON or OFF only the #1A inductor, and as stated before, the switches can be used in any order or combination thus providing a wide range of different current levels for use in welding in 10 amp jumps. The switches are single pole single throw which is either in the ON position or OFF position. Naturally no current flows through the inductor switch when in the OFF position.

The diode #6 used, is a silicon rectifier with the anode and connected to lead #A and the cathode end connected to lead #B. The diode rating is chosen according to the output power rating of the alternator used. Also, the diode #6 requires a proper heat sink for cooling.

Lead #A is a controlled power lead that is connectable to one of a choice of two leads #D or #E for a controlled power in welding. Lead #B is connected to the positive terminal of the battery system #7 and the negative terminal of the battery system #7 is connected to the ground. Lead #C is connected to the output power plus line #22 of the principal power source and means of connecting the output power negative line #21 to the ground. The 5 jacks used are a single conductor taper lock type, a standard used in welding. Jack #9 and jack #10 are connected to lead #A. Jack #11 and jack #12 are connected to lead #B. Jack #13 is connected to the ground. The 3 jack plugs used are a single conductor taper lock type, a standard used in welding. Jack plug #8 is connected to lead #C which is connectable to one of a choice of two leads, either lead #A or lead #B, as desired for welding. Jack plug #14 is connected to lead #E which is the welding cable with the work clamp #15. For reverse polarity in welding jack plug #14 is connectable to the ground jack #13. Jack plug #16 is connected to lead #D which is the welding cable with the electrode holder #17. For reverse polarity in welding jack plug #16 is connectable to one of a choice of two jacks, either jack #10 on lead #A or jack #12 on lead #B, as desired for welding. For straight polarity in welding reverse the welding cables. All ground connectors (a commond ground) are to the vehicle's chassis. Combining the two sources of power at the workload in welding works best for most welding jobs. Coupling means, jack plug #8 being plugged into jack #9, jack plug #14 being plugged into jack #13, jack plug #16 being plugged into jack #10, now select a welding current by using said switching system.

Various changes may be made in the details of construction without departing from the spirit and scope of my invention as defined by the appended claims.

Having thus described my invention, I claim:

1. An arc welding system comprising:
    five single conductor taper lock jacks, means connecting first and a second jack to a first lead, means connecting a third and a fourth jack to a second lead, means connecting a fifth jack to ground, a first jack plug, means connecting said jack plug to a third lead;
    two welding cables, one welding cable having a workpiece clamp connected at one end and having a second jack plug at the other end, said second jack plug being plugged so into said fifth jack, the other welding cable having an electrode holder connected to one end and a third jack plug at the other end, said third jack plug being plugged into a selected one of two jacks, a jack on the first lead and or a jack on the second lead;
    a supplemental power supply comprising a thirty-six volt battery system, installation means connecting said battery system to an automobile type vehicle, means connecting a negative terminal of said battery system to ground, means connecting a positive terminal of said battery system to said second lead;
    a principal power source comprising an alternator of said vehicle and a battery charger of said vehicle, said alternator is connected to said battery charger, means connecting a negative output power terminal of said battery charger to ground, means connecting a positive output power terminal of said battery charger to said third lead, said first jack plug being plugged into a selected one of two jacks, a jack on the first lead or a jack on the second lead;
    means electrically connecting said principal power source and said supplemental power supply at workload in welding, said first jack plug being connected into said first jack on said first lead, said second jack plug being plugged into said fifth jack, said third jack plug being plugged into second jack on said first lead, said principal power source provides a first portion of energy at said workload and said supplemental power supply provides a second portion of energy at said workload; whereby the jack selections determine the amount of energy supplied at said workload;
    a silicon rectifier diode, means connecting said diode across said first lead and said second lead, said diode is poled to block current flow from said battery system into said workload, said diode provides said battery system with a charging means during time when an arc is not generated.

2. An arc welding system as set forth in claim 1, further comprising said battery charger having the following required control means:
    an ammeter means;
    a voltmeter means;
    a voltage control means that regulates said alternator's output voltage;
    a current limiter means that regulates said alternator's output current.

3. An arc welding system as set forth in claim 1, wherein said electrode holder has a heavy duty cutting means and/or an extra-heavy duty welding means, coupling means whereby said second jack plug being plugged into said fourth jack on said second lead, said third jack plug being plugged into said fifth jack thus transferring energy direct from said battery system to said workload.

4. An arc welding system as set forth in claim 1, further comprising a light duty welding means connected to said electrode holder wherein energy from said principal power source only is used at said workload in welding, coupling means said first jack plug being plugged into said first jack on said first lead, said second jack plug being plugged into said fifth jack, said third jack plug being plugged into said second jack on said first lead.

5. An arc welding system a set forth in claim 1, further including a control system comprising: five inductors, five switches, said switches are a singlepole two-position OFF/ON type, first means connecting a first inductor in series with a first switch between a first lead and a second lead, said first means has ability to transfer 10 amps current from a battery system to said workload in welding when said switch is in ON position;
    second means connecting a second inductor in series with a second switch between said first lead and said second lead, said second means has ability to transfer 20 amps current from said battery system to said workload in welding when said switch is in ON position;
    third means connecting a third inductor in series with a third switch between said first lead and said second lead, said third means has ability to transfer 40 amps current from said battery system to said workload in welding when said switch is in ON position;
    fourth means connecting a fourth inductor in series with a fourth switch between said first lead and said second lead, said fourth means has ability to transfer 80 amps current from said battery system to said workload in welding when said switch is in ON position;
    fifth means connecting a fifth inductor in series with a fifth switch between said first lead and said second lead, said fifth means has ability to transfer 100 amps current from said battery system to said workload in welding when said switch is in ON position; whereby the control system controls current flow from said battery system to said workload in welding, said switches operate independent of each other hence being capable of producing up to twenty-five different current levels in 10 amps jumps from 10 amps through 250 amps for use in welding.

* * * * *